Figure 1:
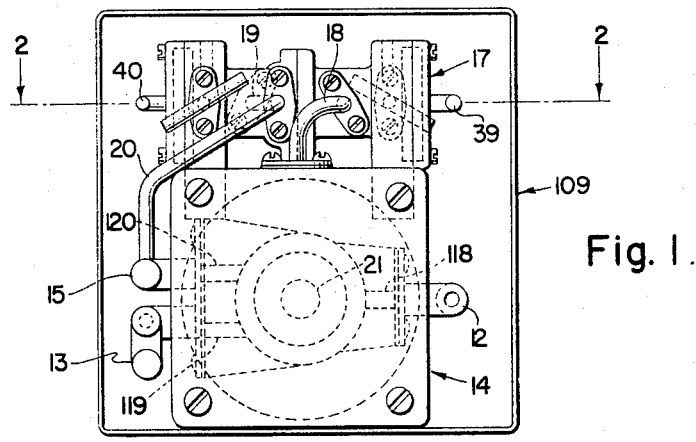

Oct. 10, 1961 W. M. HARCUM ET AL 3,003,513
PNEUMATIC MODULATOR RESPONSIVE TO DIFFERENTIAL PRESSURE
Filed April 14, 1958

INVENTORS
William M. Harcum &
Edward D. Watson
BY
James C. Gussman
& John C. McYager
ATTORNEYS

United States Patent Office 3,003,513
Patented Oct. 10, 1961

3,003,513
PNEUMATIC MODULATOR RESPONSIVE TO DIFFERENTIAL PRESSURE
William M. Harcum, Ambler, and Edward D. Watson, Norristown, Pa., assignors to Aircraft Products Co., Bridgeport, Pa., a corporation of Pennsylvania
Filed Apr. 14, 1958, Ser. No. 728,408
5 Claims. (Cl. 137—82)

This invention relates to pneumatic devices and more particularly to pneumatic repeater or amplifier units useful, for example, in pneumatic automatic pilots.

The amplification of pneumatic signals of relatively low intensity requires highly sensitive and, therefore, critical mechanical components. Conventional pneumatic devices for amplifying low level pneumatic signals present problems of alignment and adjustment. Moreover, the mass of the moveable elements of such units tends to be large, thereby interfering with the ability of the unit to respond rapidly and accurately.

It is, therefore, one object of the present invention to provide an improved pneumatic repeater or amplifier unit responsive to input signals of relatively low level.

Another object of the invention is to provide a pneumatic amplifier or repeater unit, the moving parts of which have relatively low mass.

Still another object of the invention is to provide an improved pneumatic amplifier or repeater unit for use in multi-stage pneumatic amplifiers of automatic pilots.

In accordance with the present invention, there is provided a pneumatic amplifier or repeater unit having a pair of input or end chambers to receive low level pneumatic pressure differentials representative of signals to be amplified. These chambers, which are preferably coaxial, each contains a flexible diaphragm and the centers of the two diaphragms are joined by a tension filament or wire. The inherent resilience of the diaphragms maintains the filament under tension. Mounted in a central chamber on the stressed filament between its ends and capable of moving axially therewith is a valve disk, opposite sides of which work in conjunction with pneumatic orifices adapted to be differentially valved upon movement of the disk in either axial direction, although there is substantially no response to movement of the valve disk in its own plane. The respective orifices are connected to pressure conduits from which the amplified output signals are taken and the central chamber in which the disk moves is connected to a source of pneumatic energy. The end chambers, in which the diaphragms are mounted, are preferably connected on the opposite side of the diaphragms from which the input signals are introduced, to a common reference pressure source such, for example, as the atmosphere.

Figure 2:
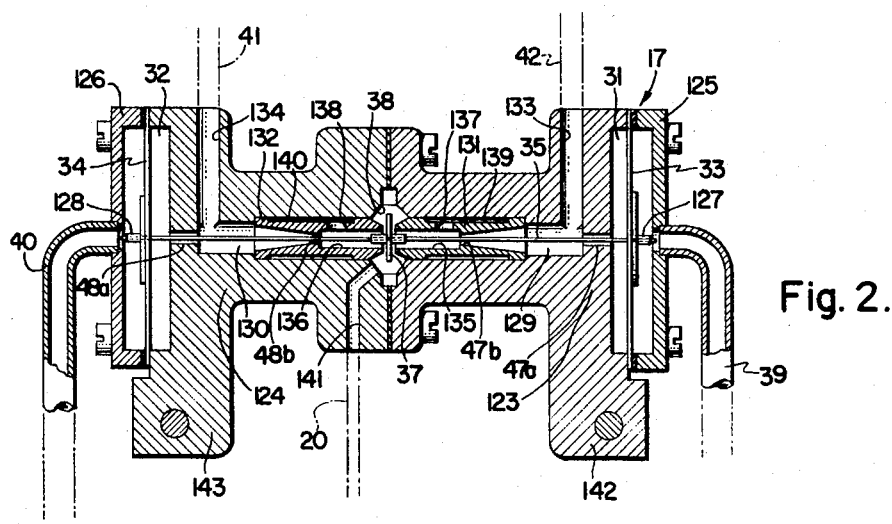

The above and other features and objects of the present invention will be apparent from the following specification having reference to the accompanying drawings; in which:

FIGURE 1 is a view in side elevation of a pneumatic amplifier or repeater unit, showing the unit mounted on a second stage amplifier unit; and FIGURE 2 is a view in vertical section and in enlarged scale of the pneumatic amplifier or repeater unit of FIGURE 1 taken on the line 2—2 thereof, looking in the direction of the arrow.

Referring to the drawing, the invention is illustrated as embodied in a pneumatic amplifier or repeater unit indicated generally by the numeral 17 adapted to receive low level input signals in the form of pneumatic pressure differentials connected to the unit via input conduits 39 and 40. Pneumatic output signals of higher pressure differential are furnished via output conduits 18 and 19. Broadly, the unit 17 includes a pair of diaphragm chambers 31 and 32 containing diaphragms 33 and 34 respectively, the diaphragms being joined at their centers by a tension member in the form of a wire or filament 35. The filament passes through a central valve chamber 38 and therein supports a valve disk 37 which is moveable axially back and forth to effect a differential valving action as between the output conduits 18 and 19. Feedback conduits 41 and 42 are connected to the diaphragm chambers 31 and 32 respectively, as will be described below.

The body of the repeater or amplifier 17 includes a pair of central body portions 123, 124 to opposite ends of which headcaps 125, 126 are bolted to define the cylindrical diaphragm chambers 31 and 32, in which the diaphragms 33 and 34 are respectively secured at their peripheries. The inlet conduits 39 and 40 communicate directly with the spaces on the outer sides of the diaphragms 33 and 34 to impress thereacross the differential pneumatic pressure from, for example, the sensing portions of an automatic pilot system such as that described in the co-pending application, Serial No. 728,158, filed April 14, 1958.

The body portions 123 and 124 define at their centers, where they are joined together, the central chamber 38 in which the valve element 37, taking the form of a circular disk, is positioned by means of the tension member or wire 35, which is attached by fittings 127 and 128 to the centers of the diaphragms 33 and 34 respectively. The body portions 123 and 124 are formed adjacent the diaphragm chambers 31 and 32, with pneumatic constrictions 47a and 48a communicating with enlarged inner chambers 129 and 130 respectively. Fitted within these chambers are a pair of constriction and valving or nozzle sleeves 131 and 132 respectively. Pneumatic constrictions 47b and 48b are formed in the sleeves 131 and 132, and the inner ends of the sleeves extend into the central chamber 38 to points closely adjacent opposite sides of the valve element 37 to establish the balanced valving action described above. The force feedback conduits 41 and 42, which carry pneumatic feedback signals from a subsequent position of the pneumatic system, as described in the copending application Serial No. 728,158, filed April 14, 1958, communicate with ducts 133 and 134 formed in the body portions 123 and 124, the ducts communicating respectively, via the restrictions 47a and 48a with the diaphragm chambers 32 and 31 on the inner sides of the diaphragms. Thus the feedback signals are able to influence, differentially, the diaphragm action to modify the valve action of the repeater unit.

The output signals are taken from cylindrical chambers 135 and 136 in the inner ends of the sleeves 131 and 132, this being accomplished by radial ducts 137 and 138 communicating with circumferential recesses 139 and 140 on the outer surfaces of the sleeves, which recesses are placed respectively in communication with the conduits 18 and 19 by means of ducts in the body portions 123 and 124 which extend perpendicular to the plane of the paper as seen in FIGURE 2 and which are not, therefore, visible in the figure. A conduit duct 20 from a vacuum source communicates with the central chamber 38 through a duct 141 formed in the body portion 124. The valve assembly 17 includes tapped, mounting lugs 142 and 143 formed on the body portions 123 and 124.

In this fashion, there is provided a highly sensitive repeater unit or pneumatic amplifier in which differential pneumatic signal pressures introduced via the conduits 39 and 40 and acting on the opposed diaphragms 33 and 34 cause the valve element 37 to shift to the left or the right in response to extremely low level signals to change the balance or division of pneumatic flow from the vacuum power source conduit 20 (and hence the central chamber 38) to the output ducts 18 and 19 to drive the next stage of the pneumatic system. The flow paths from the chamber 38 to the output ducts include the chambers 135, 136, the radial ducts 137, 138, and the recesses 139, 140. Pneumatic feedback signals are introduced via the conduits 41 and 42 and the pneumatic constructions 47a, 48a. The moveable portions of the assembly, including the diaphragms, the tension member and the valve disk, have relatively low mass and are, therefore, capable of extremely rapid response. Moreover, the assembly affords positive alignment as well as insensitivity to lateral motion of the valve disk. The invention finds particular utility in pneumatic automatic pilot systems, such for example, as that described in the said co-pending application, Serial No. 728,158, filed April 14, 1958.

While the invention has been illustrated and described having reference to a preferred embodiment thereof, it will be understood that it can take various forms and arrangements. The invention should not, therefore, be regarded as limited, except as defined by the following claims.

We claim:

1. In a pneumatic amplifier, a body portion, a pneumatic power chamber in the body portion, a pair of diaphragm chambers flanking the power chamber and each having a diaphragm therein, a pneumatic power input conduit connected to the power chamber between the ends thereof, a pair of pneumatic power output conduits connected to the power chamber on opposite sides of center, a tension member connecting the two diaphragms and moveable therewith, valve element means on the tension member and moveable therewith to control the relative flow of pneumatic energy to the two output conduits, and a pair of pneumatic signal input conduits connected respectively to said diaphragm chambers, said power chamber communicating at opposite ends with the respective diaphragm chambers on the opposite sides of the diaphragms from the signal input conduit connections, and pneumatic constrictions between the pneumatic power chamber and the diaphragm chambers.

2. In a pneumatic amplifier, a body portion having a pneumatic power chamber flanked by a pair of input chambers, diaphragm means in the respective input chambers, a pair of input conduits connected respectively to the input chambers on the outer sides of the diaphragms, a tension filament coupling the diaphragms and passing axially through the power chamber, a pair of axially directed output nozzles in the power chamber on opposite sides of center and arranged in axially opposed, spaced-apart relationship, and a valve element supported by the filament between the nozzles and moveable in translation therebetween in a differential valving action.

3. In a pneumatic amplifier, a body portion having a pneumatic power chamber flanked by a pair of input chambers, diaphragm means in the respective input chambers, a pair of input conduits connected respectively to the input chambers on the outer sides of the diaphragms, a tension filament coupling the diaphragms and passing through the power chamber, a pair of axially directed output nozzles in the power chamber on opposite sides of center, and a valve element supported by the filament between the nozzles and moveable therebetween in a differential valving action, said tension filament passing through said nozzles.

4. Apparatus as set forth in claim 3, including pneumatic constrictions placing the power chamber in communication with the diaphragm chambers.

5. Apparatus as set forth in claim 4, including a pair of pressure feedback ducts connected respectively to the diaphragm chambers between the pneumatic constriction means and the diaphragm chambers, thereby to differentially influence the diaphragms to actuate the valve to modify the action thereof.

References Cited in the file of this patent

UNITED STATES PATENTS

| 2,286,282 | Joesting | June 16, 1942 |
| 2,392,300 | Ziebolz | Jan. 1, 1946 |
| 2,514,445 | Eckman | June 11, 1950 |
| 2,588,622 | Eckman | Mar. 11, 1952 |
| 2,635,581 | Karig | Apr. 21, 1953 |
| 2,726,671 | Zand et al. | Dec. 13, 1955 |
| 2,755,032 | Justus | July 17, 1956 |

FOREIGN PATENTS

| 668,006 | Great Britain | Mar. 12, 1952 |